3,530,168
PREPARATION OF ESTERS
Giovanni Biale, Fullerton, Calif., assignor to Union Oil Company of California, Los Angeles, Calif., a corporation of California
No Drawing. Filed Aug. 30, 1966, Ser. No. 575,980
Int. Cl. C07c *69/54, 69/56, 69/58*
U.S. Cl. 260—486      9 Claims

ABSTRACT OF THE DISCLOSURE

The invention comprises the oxidative carbonylation of a hydrocarbon olefin by contacting the olefin, carbon monoxide and oxygen with an alcoholic reaction medium containing a catalyst comprising a Group VIII noble metal in complex with a biphyllic ligand. The reaction forms esters of saturated and unsaturated carboxylic acids having one more carbon than the olefin and esters of dicarboxylic acids having two more carbons than the olefin. A specific illustration is the formation of methyl acrylate by introducing ethylene, carbon monoxide, and oxygen into a methanol solution comprising palladous chloride, cupric chloride, and triphenylphosphine at a pressure of about 1000 p.s.i.g. and at a temperature of about 150° C.

DESCRIPTION OF THE INVENTION

This invention relates to a method for the preparation of alkyl and alkenyl esters from olefins and describes a method for the direct preparation of these esters by an oxidative carbonylation reaction.

This invention comprises contacting of an olefin, carbon monoxide and oxygen with an alcoholic solution of a catalyst comprising a Group VIII noble metal and a biphyllic ligand hereinafter defined. Optionally, a redox agent is also included in the solution to facilitate the rate of reaction. The aforementioned reaction is achieved under relatively mild conditions and provides a direct method for the preparation of mono- and diesters of saturated and unsaturated carboxylic acids having one more carbon atom than the olefin reactant.

The reaction can be conducted under relatively mild conditions, e.g., 25° to about 300° C. and pressures from about atmospheric to 2500 p.s.i.g. The reaction is preferably performed under liquid phase conditions with a reaction medium containing a reactant alcohol. A wide variety of organic liquids can be used as the reaction solvent although in the preferred embodiment an excess of the alcohol reactant is employed to serve as the reaction medium.

Referring now to the alcoholic reactant which, preferably, is also the reaction medium, any alkyl, cycloalkyl, aryl, alkaryl or aralkyl monohydroxy alcohol having from about 1 to 10 carbons can be employed. Preferably, aliphatic alcohols having from about 1 to 6 carbons are used. Examples of suitable alkanols include methanol, ethanol, propanol, isopropanol, butanol, isobutanol, pentanol, isopentanol, hexanol, heptanol, octanol, nonyl, decanol, etc. Cyclic alcohols such as cyclohexanol, cyclopentanol, 2-ethylcyclohexanol, etc., can be employed. Phenol, benzyl alcohol, para methylbenzyl alcohol, ortho, meta or para cresol, cumenol, xylenol, etc., can also be employed if desired.

As previously mentioned, the alcohol is preferably used in excess and thus comprises the reaction medium. If desired, however, other organic solvents which are liquid at the reaction conditions and inert to the reactants and products can also be employed. Such solvents include for example: various ethers such as methyl ethyl ether, diethyl ether, diisopropyl ether, dichloroethyl ether, ethylene glycol diisoamyl ether, ethyl phenyl ether, diethylene glycol diethyl ether, triethylene glycol diethyl ether, tetraethylene glycol dimethyl ether, etc.

Various esters can also be employed as the solvents such as methyl formate, ethyl formate, methyl acetate, ethyl acetate, n-propyl formate, isopropyl acetate, ethyl propionate, n-butyl formate, sec-butyl acetate, isobutyl acetate, ethyl n-butyrate, n-butyl acetate, isoamyl acetate, n-amyl acetate, glycol diformate, furfural acetate, isoamyl n-butyrate, ethyl acetylacetate, diethyl oxalate, glycol diacetate, isoamyl isovalerate, methyl benzoate, ethyl benzoate, methyl salicylate, n-propyl benzoate, n-dibutyl oxalate, etc.

Saturated hydrocarbons can also be used such as pentane, hexane, heptane, octane, decane, dodecane, mineral oils, etc.

The acid portion of the ester produced in accordance with my invention is derived from the olefin. When an ester of a mono carboxylic acid is prepared, the acid portion contains one more carbon than the olefin. When an ester of a dicarboxylic acid is produced, the acid contains two more carbons than the olefin. Accordingly, the identity of the product desired dictates the choice of the hydrocarbon olefin; acrylates, succinates and propionates being obtained from ethylene while methacrylates, crotonates and butyrates are obtained from propylene. Examples of hydrocarbon olefins which can be reacted are as follows: ethylene, propylene, butene-1, butene-2, isobutene, pentene-1, pentene-2, 2-methylbutene-1, 2 methylbutene-2, cyclopentene, hexene-1, hexene-2, hexene-3, cyclohexene, 2-ethylbutene-1, 2-methylpentene-1, heptene-3, 2-ethylhexene-3, cycloheptane, 1-mehtylcyclohexene, 1-octene, isooctene, cyclooctene, 1-ethylcyclohexene, 1-nonene, isononene, 1-decene, 1-butylcyclohexane, 1,3-diethylcyclohexene, isodecene, indene, styrene, alphamethylstyrene, allyl benzene, etc. In general, any hydrocarbon mono-olefin having from about 2 to about 10 carbons, preferably from about 2 to about 6 carbons, can be employed in the reaction provided that at least one of the unsaturated carbons is bonded to a hydrogen to form an available carbonylation site. Alkenes of 1 to 6 carbons are preferred reactants.

The reaction is performed in the presence of a Group VIII noble metal which can be of the platinum subgroup, i.e., platinum, rhodium or ruthenium, or of the palladium subgroup, i.e., palladium, uranium or osmium. Palladium is preferred because of its demonstrated greater activity. The Group VIII noble metal can be employed in amounts between about 0.001 and 5.0 weight percent of the liquid reaction medium; preferably between about 0.04 and about 0.5 weight percent. The Group VIII noble metal can be introduced into the reaction medium as a finely divided metal, as a soluble salt, or as a chelate. Examples of suitable salts are the halides, sulfates, nitrates and salts of lower carboxylates containing up to about 5 carbons, such as palladium chloride, palladium acetate, rhodium acetate, ruthenium bromide, osmium bromide, iridium nitrate, palladium sulfate, palladium acetate, platinum propionate, etc. Examples of suitable chelates are palladium acetyl acetonate and complexes of the aforementioned platinum group metal ions with such conventional chelating agents as citric acid, ethylene diamine tetraacetic acid, etc.

As previously mentioned, my invention comprises the discovery that a biphyllic ligand can stabilize the catalyst composition and permit a continuous processing of the reaction without encountering excessive oxidation of the carbon monoxide to carbon dioxide or to carbon dioxide byproducts such as carbonates. The biphyllic ligand when used according to my invention imparts a tolerance of the reaction system to water. The water unavoidably accumulates in a continuous process when oxygen is introduced to maintain the catalyst in its active, higher valency unless elaborate steps are taken to continuously remove the water, e.g., addition of a dehydrating agent. The use of the biphyllic ligand according to my invention eliminates the need to maintain an entirely anhydrous reaction medium and thereby significantly simplifies the synthesis.

The biphyllic ligand employed in my invention is a compound having an element with a pair of electrons capable of forming a coordinate bond with a metal atom and simultaneously having the ability to accept an electron from the metal of the catalyst. In this manner, the ligand imparts stability to the resulting complex of the catalyst. Biphyllic ligands can comprise organic compounds having at least about 3 carbons and containing arsenic, antimony or phosphorus in a trivalent state. Of these, the phosphorus compounds, i.e., the phosphines, are preferred; however, the arsines or stibines can be employed. In general, these biphyllic ligands have the following structure:

$$E(R)_3$$

or the following structure:

$$(R)_2ER'E(R)_2$$

wherein E is a trivalent atom selected from the class consisting of phosphorus, arsenic and antimony; and
wherein R is a member of the class consisting of hydrogen, alkyl from 1 to 8 carbon atoms, aryl from 6 to 8 carbons and halo and alkoxy substitution products thereof; and
wherein R' is alkylene having from 1 to about 8 carbons.

Examples of suitable biphyllic ligands having the aforementioned structure and useful in my invention to stabilize the catalyst composition are the following: trimethyl phosphine, triethyl arsine, triisopropyl stibine, diethyl chlorophosphine, triaminobutyl arsine, ethyldiisopropyl stibine, tricyclohexyl phosphine, triphenyl phosphine, tri-(o-tolyl)phosphine, phenyldiisopropyl phosphine, phenyl diamyl phosphine, diphenylethyl phosphine, chlorodixylyl phosphine, chlorodiphenyl phosphine, tris(diethylaminoethyl)phosphine, ethylene bis(diphenyl phosphine), hexamethylene bis(diisopropyl arsine), pentamethylene bis(diethylstibine), etc. Of the aforementioned, the aryl phosphines are preferred because of their demonstrated greater activity for stabilization of catalysts.

The reaction is performed at temperatures from about 25° to 300° C., preferably from about 100° to about 225° C. Pressures employed are sufficient to maintain liquid phase conditions, however, superatmospheric pressures from about 10 to about 750 atmospheres are preferred to provide a high rate of reaction by increasing the solubility of the liquid phase for the gaseous reactants, i.e., carbon monoxide and lower molecular weight hydrocarbon olefins when these materials are employed as the reactants. Most preferably, pressures from about 30 to about 100 atmospheres are employed.

The reaction is performed by introducing the olefin, oxygen and carbon monoxide into contact with the alcoholic reaction medium that contains the Group VIII noble metal and biphyllic ligand and, optionally, a redox agent comprising a soluble salt of a multivalent metal having an oxidation potential more positive than the Group VIII noble metal. Preferably this reaction is initiated under substantially anhydrous conditions to maximize the length of the reaction period, i.e., the period before removal of all or a portion of the reaction medium is necessitated by the accumulation of a prohibitively high concentration of water. In general, the water content of the reaction medium should be maintained less than about 20, preferably less than about 10, and most preferably less than about 5 weight percent.

The oxygen and carbon monoxide are supplied to the reaction zone at sufficient rates to provide a partial pressure of these reactants which is at least aboue one atmosphere and preferably from about 10 to 100 atmospheres. The relative rate of an introduction of the carbon monoxide and oxygen are from about 1:10 to 10:1 mols per mol, preferably rates from about 1:1 to about 5:1 and most preferably from 1:1 to 2:1 molecular ratios are used. If desired, a suitable inert gas can also be charged to the reaction zone to reduce the partial pressures of the reactant gases, i.e., oxygen, carbon monoxide and when present a gaseous olefin. Nitrogen is a suitable inert gas although other gases such as carbon dioxide, argon, helium, etc., can also be employed if desired.

The process can be conducted continuously or batchwise; however, continuous processing is preferred. In the latter technique, the catalyst is charged to the reaction zone in a suitable solvent or an excess of the olefin and the gaseous reactants are introduced into contact with the reaction solvent and catalyst in the reaction zone. A continuous withdrawal of the liquid phase in the reaction zone can be employed; this material is then reduced in pressure to remove the dissolved gases which can be recycled to further reaction. The depressed liquid effluent is then cooled and distilled to recover the desired products and water from the reaction medium which is thereafter returned to the reaction zone. When low molecular weight products are produced, i.e., acrylate and methacrylate esters, these products can be removed by employing a high gas rate through the reactor to strip the product from the reaction solvent which, desirably, is a high-boiling liquid such as a tertiary butanol, tertiary amyl alcohol, butyrolactone, or any of the aforementioned inert solvents.

The practice of the invention will now be illustrated by the following examples which will also serve to demonstrate the results obtainable thereby:

EXAMPLE 1

A solution of 0.5 gram of palladous chloride, 5 grams cupric chloride, 5 grams cuprous chloride and 2.5 grams triphenyl phosphine in 300 grams methanol was introduced into a ½ gallon titanium-lined autoclave. The autoclave had facilities for stirring and cooling of the liquid contents. The autoclave was closed, pressured with 450 p.s.i. ethylene and an additional 450 p.s.i. of carbon monoxide. The autoclave was then heated to 300° F. and oxygen was slowly introduced at approximately 10 p.s.i., increments over a 30-minute reaction period. The autoclave was cooled, depressured, opened and the liquid contents were distilled to obtain approximately 30 grams of succinic acid and dimethyl succinate and approximately 12 grams of methyl acrylate.

EXAMPLE 2

Into the autoclave was introduced a solution comprising 0.5 grams palladous chloride, 2.5 grams cupric chloride, 2.5 grams cuprous chloride, 5 grams triphenyl phosphine and 300 grams methanol. The autoclave was then charged with 111 grams propylene and pressured to 600 p.s.i. with carbon monoxide. The autoclave was heated to 300° F. and maintained at that temperature while oxygen was introduced in 20 p.s.i. increments. After a 15-minute reaction period, the addition of oxygen was ceased and the autoclave was cooled, depressured and opened. The products recovered yielded 10.3 methyl methacrylate, 14.6 grams methyl butyrate and 178 grams methyl crotonate.

The experiment was repeated in the absence of triphenyl phosphine and 24.4 grams methyl carbonate and 23.4 grams dimethyl pyrotartarate were produced. The methyl carbonate resulted from excessive oxidation of the carbon monoxide reactant to carbon dioxide.

EXAMPLE 3

The autoclave was charged with a solution of 0.5 grams palladous chloride, 5 grams cupric chloride, 5 grams lithium chloride, 2 grams tri-p-tolylphosphine and 300 grams methanol. The autoclave was closed, pressured to 525 p.s.i. with ethylene and an additional 350 p.s.i. of carbon monoxide was introduced. The autoclave was then heated to 300° F. and maintained at that temperature while oxygen was introduced in 20 p.s.i. increments. After a 15-minute reaction period, further addition of oxygen was ceased and the autoclave was cooled, depressured and opened and the products distilled to recover 5 grams methyl acrylate and 3.8 grams methyl succinate.

The experiment was repeated with the substitution of tri-n-butyl phosphine for the tri-p-tolylphosphine previously employed. Products obtained were 5 grams methyl acrylate and 7 grams methyl succinate.

EXAMPLE 4

The autoclave was charged with a solution of 0.5 grams palladous chloride, 5 grams cupric chloride, 5 grams cuprous chloride and 2.5 grams triphenyl arsine in 300 grams methanol. The autoclave was closed and pressured to 450 p.s.i. with carbon monoxide and an additional 450 p.s.i. of ethylene was introduced. The autoclave was then heated to 300° F. and oxygen was introduced at 20 p.s.i. increments. After 15 minutes further introduction of oxygen was ceased and the autoclave was cooled, depressured and opened and the products distilled to recover 21.8 grams of methyl succinate.

The preceding experiment was repeated with the substitution of 2.5 grams triphenyl stibene. The reaction was performed over a 15-minute period and the product was distilled to recover 14.2 grams methyl acetate, 2.5 grams methyl propionate, and 1.6 grams methyl succinate. Approximately 10 grams of other unidentified products was also recovered.

Similar results can also be obtained when equal weights of ethylene bis(diphenyl phosphine) or chloroxylyl phosphine are substituted for the triphenyl phosphine used in the preceding experiments.

The preceding examples were performed in laboratory autoclaves that had only a single inlet for a gaseous reactant. Accordingly, all the carbon monoxide had to be charged to the autoclave at the start of the experiment and considerable carbonylation occurred before the oxygen was introduced. This carbonylation under non-oxidizing conditions is not desired because it produces the less valuable saturated esters. In the best mode for practicing the invention, the preceding experiments would be modified by delaying the carbon monoxide introduction so that this reactant would be simultaneously introduced with the oxygen.

In this preferred mode of practice, the oxidative carbonylation reaction would predominate since it is several-fold faster reaction than the reductive carbonylation. Accordingly, the product yields can be markedly altered to obtain the unsaturated esters, e.g., acrylates, methacrylates and crotonates, as the major products of the oxidation.

The following illustrates the results obtained from the entirely reductive carbonylation, i.e., no oxygen added.

The autoclave was charged with 0.5 gram palladous chloride, 2.5 grams cupric chloride, 5.0 grams cuprous chloride, 5.0 grams triphenylphosphine and 5.0 grams sodium bisulfate in 300 grams 95 percent methanol. Then, 109 grams propylene were added and the autoclave was pressured to 800 p.s.i. with carbon monoxide and heated to 300° F. and maintained at that temperature for one hour. The autoclave was cooled, depressured, opened and the liquid contents were distilled to recover 14.3 grams methyl isobutyrate and 29.8 grams methyl butyrate. This example illustrates that alkenyl esters are not produced in the absence of oxygen and that the reductive carbonylation reaction is several-fold slower than the oxidative carbonylation; compare this to Example 2 where comparable weight yields of the methacrylate ester were obtained in 15 minutes.

The preceding examples are intended solely to illustrate a mode of practicing the invention and to demonstrate results obtainable thereby. It is not intended that the invention be unduly limited by this disclosure. The preceding examples demonstrates that the use of the biphyllic ligand reduces the carbon dioxide formation in the reaction zone; see Example 2 where the formation of a large amount of $CO_2$ byproduct, i.e., methyl carbonate, was attributable to the conducting of the experiment in the absence of the biphyllic ligand. The examples also illustrate the operability of stibines and arsines which materials are, however, not as preferred as the phosphine.

It is intended that the invention be defined by the method steps and reagents and their obvious equivalents set forth in the following claims:

I claim:
1. The oxidative carbonylation of a hydrocarbon monoolefin having from 2 to about 10 carbons to an ester selected from the class consisting of esters of ethylenically unsaturated carboxylic acids having one more carbon than said olefin and esters of dicarboxylic acids having two more carbons than said olefin, which method comprises: contacting said olefin, carbon monoxide and oxygen with a liquid reaction medium containing a monohydroxy alcohol having from one to about 10 carbons and from 0.001 to 5.0 weight percent of palladium and an organic phosphine having the structure:

$$PR_3$$

wherein:
R is aryl having from 6 to 8 carbons and halo and alkoxy substitution products thereof;
maintaining the temperature in said reaction zone between about 25° and 300° C. and a sufficient pressure from 1 to about 750 atmospheres to maintain liquid phase conditions.

2. The oxidative carbonylation of claim 1 wherein said medium also contains a soluble salt of a multivalent metal having an oxidation potential more positive than palladium in said solution.

3. The carbonylation of claim 2 wherein said multivalent metal is copper.

4. The carbonylation of claim 1 wherein said olefin is ethylene, said alcohol is an aliphatic alcohol having 1 to about 6 carbons and said ester is an alkyl acrylate.

5. The method of claim 4 wherein said alcohol is ethanol.

6. The carbonylation of claim 1 wherein said olefin is propylene, said alcohol is an aliphatic alcohol having 1 to about 6 carbons and said ester is an alkyl methacrylate.

7. The method of claim 6 wherein said alcohol is methanol.

8. The method of claim 1 wherein said organic phosphine is triphenylphosphine.

9. The method of claim 1 wherein said reaction medium is initially substantially anhydrous.

References Cited

UNITED STATES PATENTS

| | | | |
|---|---|---|---|
| 2,851,486 | 9/1958 | Natta et al. | |
| 3,035,088 | 5/1962 | Dunn | 260—486 |
| 3,221,045 | 11/1965 | McKeon et al. | 260—497 |
| 3,346,625 | 10/1967 | Fenton et al. | 260—497 |
| 3,349,119 | 10/1967 | Fenton et al. | 260—497 |
| 3,381,030 | 4/1968 | Biale et al. | 260—497 |

(Other references on following page)

UNITED STATES PATENTS

| | | | |
|---|---|---|---|
| 3,397,225 | 8/1968 | Fenton | 260—484 |
| 3,397,226 | 8/1968 | Fenton | 260—484 |
| 3,168,553 | 2/1965 | Slaugh | 260—497 |

FOREIGN PATENTS 6,408,476  1/1965  Netherlands.

OTHER REFERENCES

Tsuji et al. Part II, Tetrahedron Letters No. 22, pp. 1437–1440 (1963).

Tsuji et al. Part VIII, J, Am. Chem. Soc., vol. 86, pp. 4350–4353 (1964).

LORRAINE A. WEINBERGER, Primary Examiner

P. J. KILLOS, Assistant Examiner

U.S. Cl. X.R.

260—410.5, 410.9, 468, 469, 476, 485, 497